May 21, 1963 E. BANDIROLI 3,090,444
MULTI-STAGE FOAM GENERATOR FOR EXTINGUISHING FIRES
Filed April 11, 1961
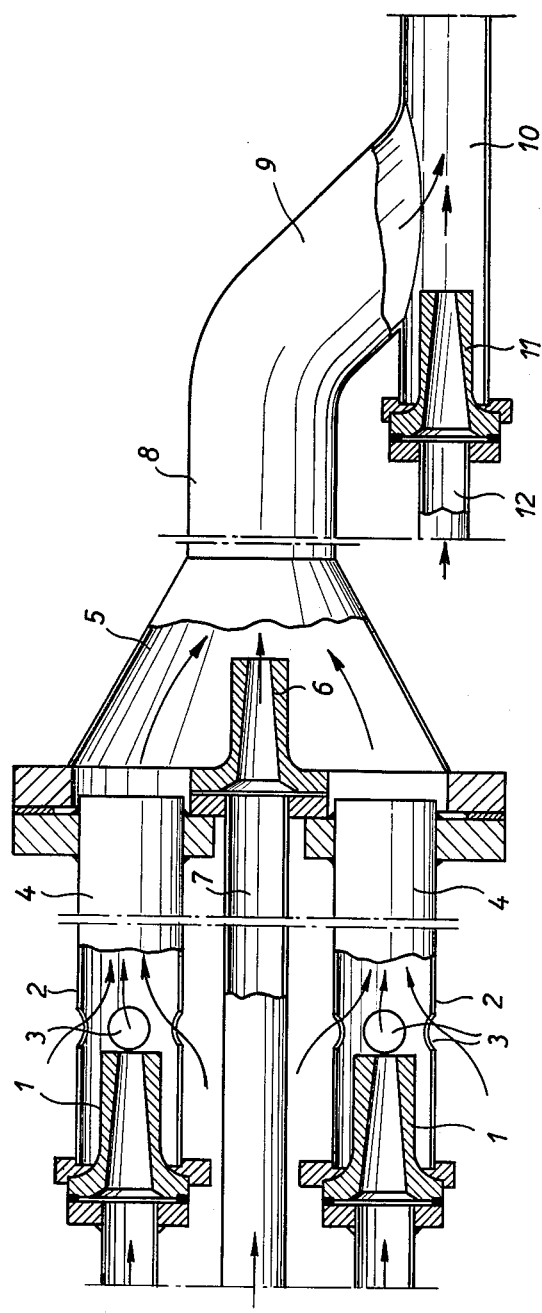

United States Patent Office 3,090,444
Patented May 21, 1963

3,090,444
MULTI-STAGE FOAM GENERATOR FOR EXTINGUISHING FIRES
Edoardo Bandiroli, Milan, Italy, assignor to Bergomi Societa per Azioni, Milan, Italy
Filed Apr. 11, 1961, Ser. No. 102,270
Claims priority, application Italy May 10, 1960
2 Claims. (Cl. 169—15)

This invention relates to a foam generator for extinguishing fires which affords high-speed wide-range jets of foam as compared with those obtainable from conventional generators, as well as an improved foam quality.

The generator according to this invention comprises at least one primary unit producing foam with excess air, and at least one secondary unit, wherein the foam produced by the primary unit impinges upon an ejector jet of water, admixed with foaming substance or not, which mixes with the foam, increases its speed and generates whirling movements which improve homogeneousness and the fire-extinguishing power of the foam jet.

The invention will be described in detail with reference to the accompanying drawing which shows diagrammatically by way of a non-limiting example a three-stage foam generator.

The generator comprises a pair of foam producers of a conventional ejector-type in parallel arrangement, each comprising a nozzle 1 through which a jet of water admixed with a foaming liquid is axially injected into one end of a conduit 2 having large radial holes 3 bored therein through which the excess air is drawn, the said air mixing in tubular extension 4 of conduits 2 with the liquid jet to form foam including excess air.

The extensions 4 open into the large end of a funnel 5 having centrally arranged therein a nozzle 6 connecting at its upstream end with a pipe 7 supplying water which may be admixed with foam liquid. The funnel 5 is closed with respect to outer atmosphere so that no atmospheric air is drawn into the funnel on operation of nozzle 6.

The nozzle 6 acts as an ejector in respect of the air-rich foam supplied from the primary foam-producers, its water jet mixing with the foam in an axial conduit 8 extending from the small end of the funnel 5, whereby homogeneousness and the extinguishing power of the foam and the speed of the latter are increased.

The nozzle 6 and its respective conduit 8 form the second stage of the generator which is connected to the first stage by a funnel 5.

The conduit 8 connects at its end through an oblique elbow section 9 with a final stage conduit 10 at the upstream end of which an axial nozzle 11 is arranged supplied from a pipe 12 with a jet of water which may be admixed with foam liquid. No outer air intakes are provided at this stage.

At this stage of the generator the water jet from the nozzle 11 and foam stream from the conduit 8, and elbow section 9 impinge upon each other, which results in a further increase in speed of the foam mass and further improvement of its homogeneousness.

Any number of stages can be provided, and the end of the conduit 10 associated with the last stage can be directly fitted with a foam-ejecting nozzle, or with a nipple for a hose carrying such a nozzle.

With the above described foam generator a high-speed wide range foam-jet is obtained as compared with those obtainable from conventional generators.

What I claim is:

1. A multi-stage foam generating apparatus for producing fire-extinguishing foam comprising; a first foam generating stage including at least two parallel elongated foam-producing chambers, each having an inlet end and an outlet end, injector means for introducing foam forming liquid into the inlet end of each chamber, means for admitting air around the injectors at the inlet end of each chamber for foam producing purposes, a funnel-shaped common chamber having a large inlet end and a foam restricting outlet opening opposite thereto, and otherwise closed to the atmosphere, the outer end of each foam-producing chamber extending into the large inlet end of the funnel-shaped chamber and spaced from the axis thereof, at least one further stage including an injector axially located in the funnel-shaped chamber between the outlet ends of the foam-producing chambers for injecting liquid in the form of a jet impinging on the foam disgorging from the foam-producing chambers for homogenizing and accelerating the foam and directing it through the foam-restricting opening of the funnel-shaped common chamber.

2. An apparatus as defined in claim 1 further comprising an additional injector stage with a foam inlet connected to the funnel outlet, and jet injector means supplying liquid for further homogenizing and accelerating the foam through this latter stage, the entire latter stage also being closed to the atmosphere.

References Cited in the file of this patent
UNITED STATES PATENTS

| | | |
|---|---|---|
| 310,896 | Kleiman | Jan. 20, 1885 |
| 1,541,352 | Halliburton | June 9, 1925 |
| 1,649,062 | Halliburton | Nov. 15, 1927 |
| 2,057,218 | Timpson | Oct. 13, 1936 |
| 2,164,153 | Friedrich | June 27, 1939 |
| 2,577,451 | Clemens et al. | Dec. 4, 1951 |
| 2,761,516 | Vassilkousky | Sept. 4, 1956 |

FOREIGN PATENTS

| | | |
|---|---|---|
| 620,751 | Great Britain | Mar. 30, 1949 |